(12) United States Patent
Cahala, Jr.

(10) Patent No.: US 9,827,894 B2
(45) Date of Patent: Nov. 28, 2017

(54) LIVESTOCK TRANSPORT TRAILER DIVIDER PANEL

(71) Applicant: Ernest E. Cahala, Jr., Gooding, ID (US)

(72) Inventor: Ernest E. Cahala, Jr., Gooding, ID (US)

( * ) Notice: Subject to any disclaimer, the term of this patent is extended or adjusted under 35 U.S.C. 154(b) by 0 days.

(21) Appl. No.: 15/240,794

(22) Filed: Aug. 18, 2016

(65) Prior Publication Data

US 2017/0129380 A1    May 11, 2017

Related U.S. Application Data

(60) Provisional application No. 62/207,067, filed on Aug. 19, 2015.

(51) Int. Cl.
   *B62D 33/04*   (2006.01)
   *B60P 3/04*    (2006.01)

(52) U.S. Cl.
   CPC .............. *B60P 3/04* (2013.01); *B62D 33/042* (2013.01)

(58) Field of Classification Search
   CPC .................................. B60P 3/04; B62D 33/042
   See application file for complete search history.

(56) References Cited

U.S. PATENT DOCUMENTS

| 3,020,083 A * | 2/1962 | Doan ........................ B60P 3/04 119/407 |
| 4,092,044 A * | 5/1978 | Hoffman ................... B60P 3/04 105/243 |
| 2017/0050579 A1* | 2/2017 | Ranka ..................... B60R 11/06 |

* cited by examiner

*Primary Examiner* — Lori L Lyjak
(74) *Attorney, Agent, or Firm* — Robert L. Shaver; Shaver & Swanson, LLP

(57) ABSTRACT

A divider panel for a livestock transport trailer, which is detachable from the counterbalance and can be rolled and stowed when not in use. The divider panel seals the gap between the counterbalance and the lower deck of the trailer, and prevents livestock from falling through the gap, or being stuck in the gap.

3 Claims, 5 Drawing Sheets

LIVESTOCK TRANSPORT TRAILER DIVIDER PANEL

PRIORITY/CROSS-REFERENCE TO RELATED APPLICATIONS

This application claims the benefit of U.S. Provisional Application No. 62/207,067, filed Aug. 19, 2015, the disclosure of which is incorporated by reference.

TECHNICAL FIELD

The disclosed technology generally relates to livestock transport trailer, and more particularly to double deck transport trailer with a nose compartment accessed by a counterbalance.

BACKGROUND

Livestock are transported from farm to market in large livestock trailers. These typically have an upper deck and a lower deck, and animals are transported with both decks full of animals in order to attain maximum efficiency. These trailers also have a nose compartment which is separated from the rest of the upper and lower deck. The nose compartment is a part of the trailer that has less height than the rest of the trailer. It is the area above where the trailer attaches to the fifth wheel of a semi-tractor, and hence is a shortened portion of the trailer. The nose compartment deck is accessed by way of a ramp that extends from the upper deck of the main compartment. The ramp is called a counterbalance, and is used to provide access to livestock animals to enter the nose compartment of the lower deck. When the ramp or counterbalance is down, one or both sides of the ramp may be exposed which allows animals to leap or fall from one or both sides of the ramp into the lower deck of the main part of the trailer. Having the ramp down also allows an animal's foot to be caught alongside the ramp, and deaths or injuries of animals are not infrequent. The ramp is usually situated so that it is along one side of the trailer, so that when the ramp is down, only one side of the ramp exposes a triangular gap to the lower deck of the trailer.

SUMMARY OF THE DISCLOSURE

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

The invention is a flexible covering which covers the triangular gap of one or both sides of the ramp and which blocks animals from leaping or falling into the lower deck's main section. The animals involved can be very heavy and strong, and a particularly strong flexible covering must be utilized. However, the flexible covering must be flexible enough it can be rolled up and stowed in the floor of the upper deck, which could also be called the ceiling of the lower deck. The preferred flexible covering is a stainless steel mesh or ring mail, which can have an optional nylon backing. The stainless steel mesh is permanently secured to the edge of the ramp and to the floor of the upper deck. When the ramp is raised, the steel mesh fabric folds by its own weight, and may be rolled up and stowed in a slot between the edge of the upper deck and the edge of the ramp. When it is rolled and stuffed into that gap, it is secured by straps, snaps or buckles or ties of various kinds which hold the triangle of fabric in place while the livestock are being transferred.

Alternatives have been utilized to prevent animals from leaping or falling through this gap on the side of the ramp. These have included fixedly mounted posts or rails. This attempt to close this gap works, but it reduces the efficiency of the livestock truck, by creating a blockage which reduces the number of animals which can be loaded into the livestock truck. It also does not prevent injury to the animal. If a large animal were to slip, its foot or leg may get stuck, which places the truck driver at risk when tasked with freeing the animal. If the animal cannot be freed, the animal must be euthanized in order to free it.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF AN EXEMPLARY EMBODIMENT

Figure 1:
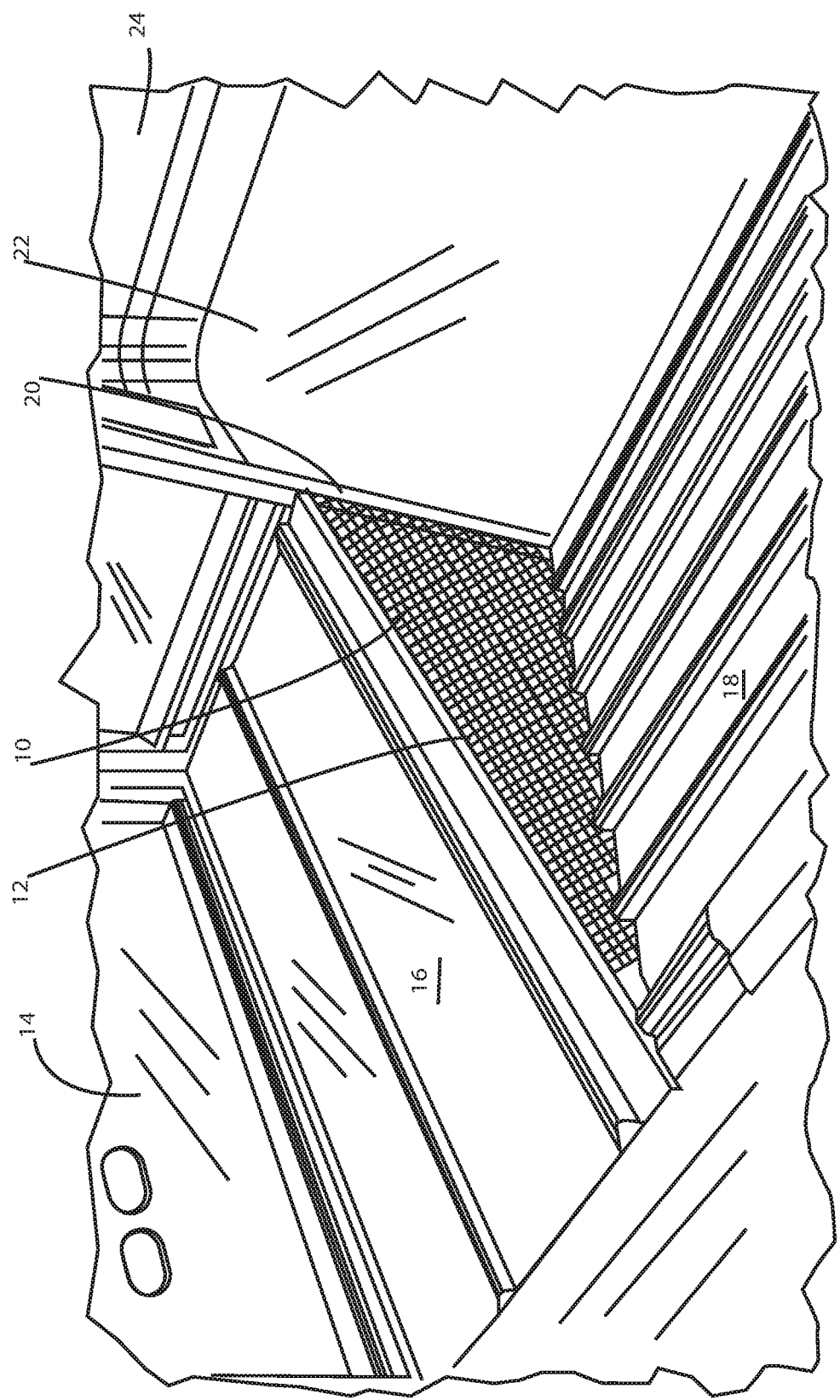
FIG. 1 is a view of the divider panel mounted in the gap.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 2:
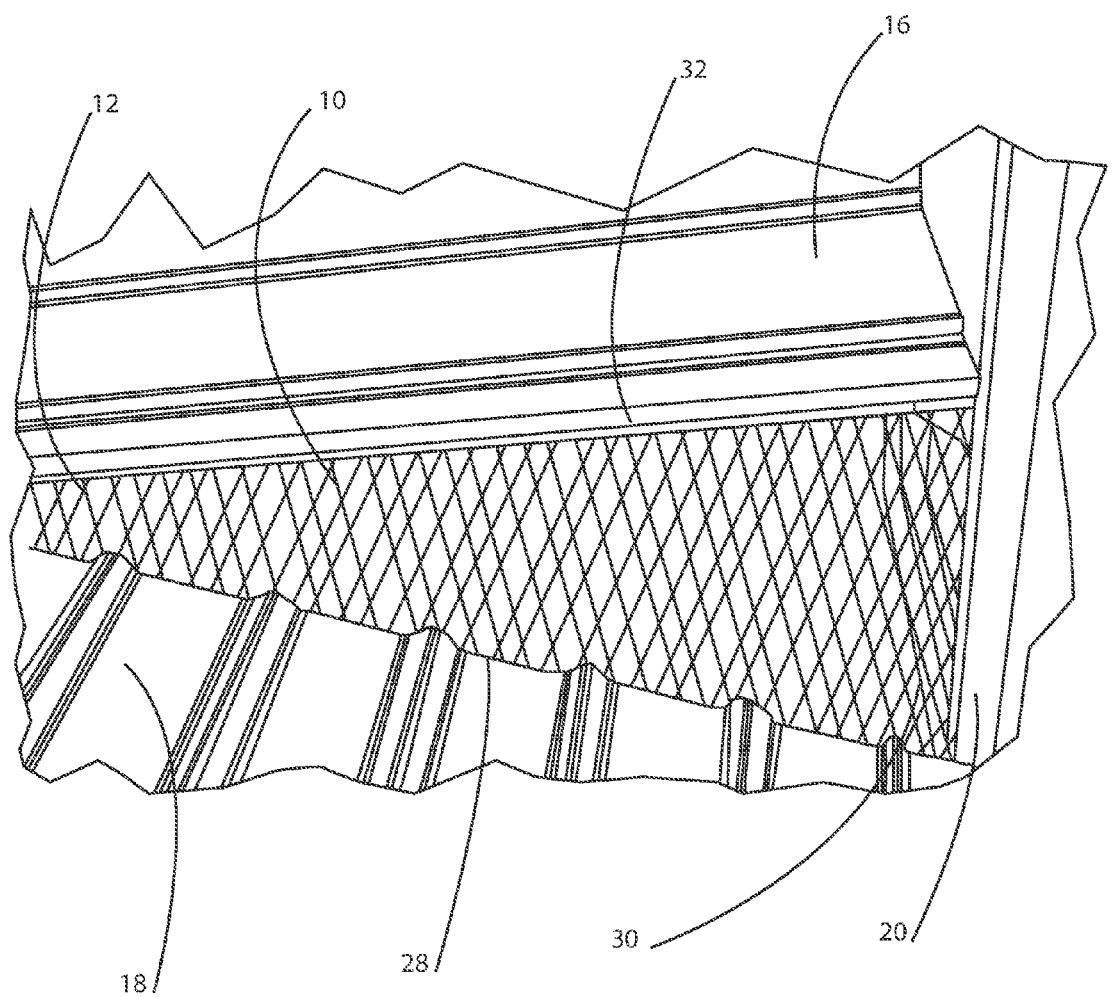
FIG. 2 is a view from the upper deck of the livestock trailer looking down to the lower deck through the triangular gap.
Figure 3:
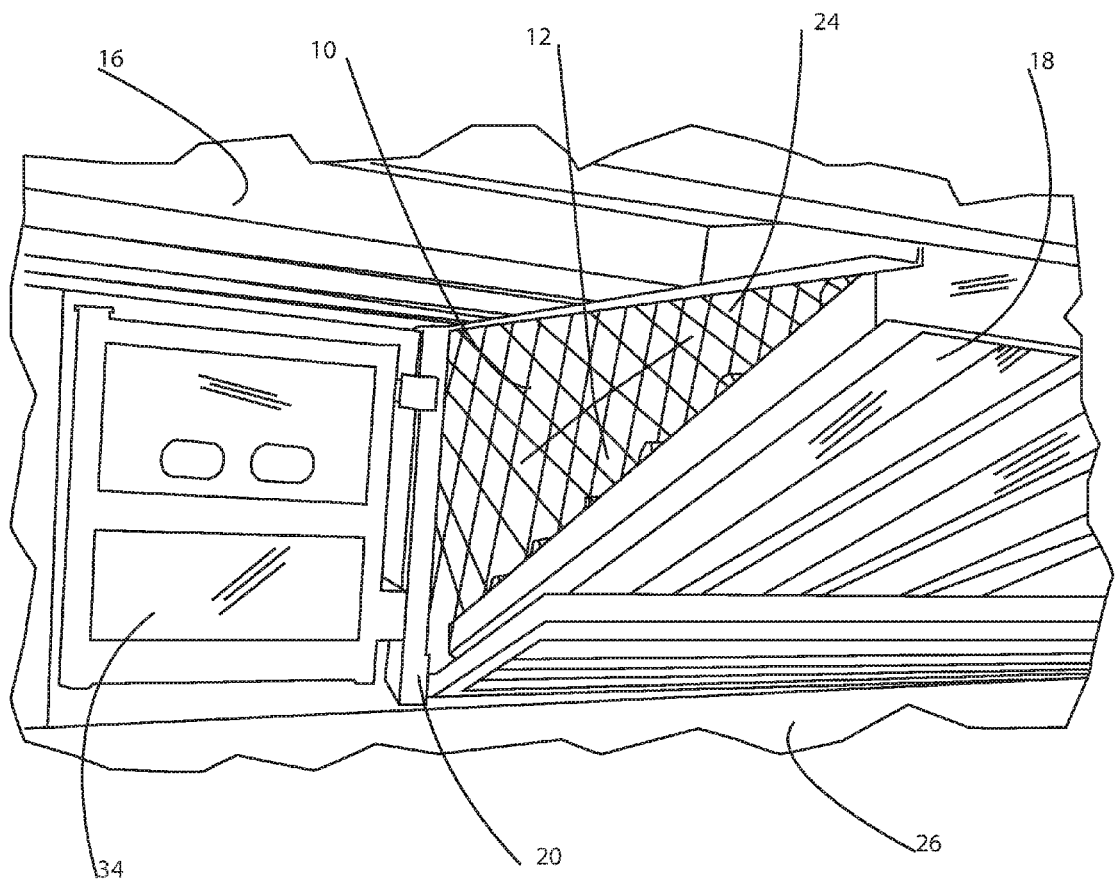
FIG. 3 is a view from the lower deck of the livestock trailer looking into the nose compartment through the divider panel and triangular gap.
Figure 4:
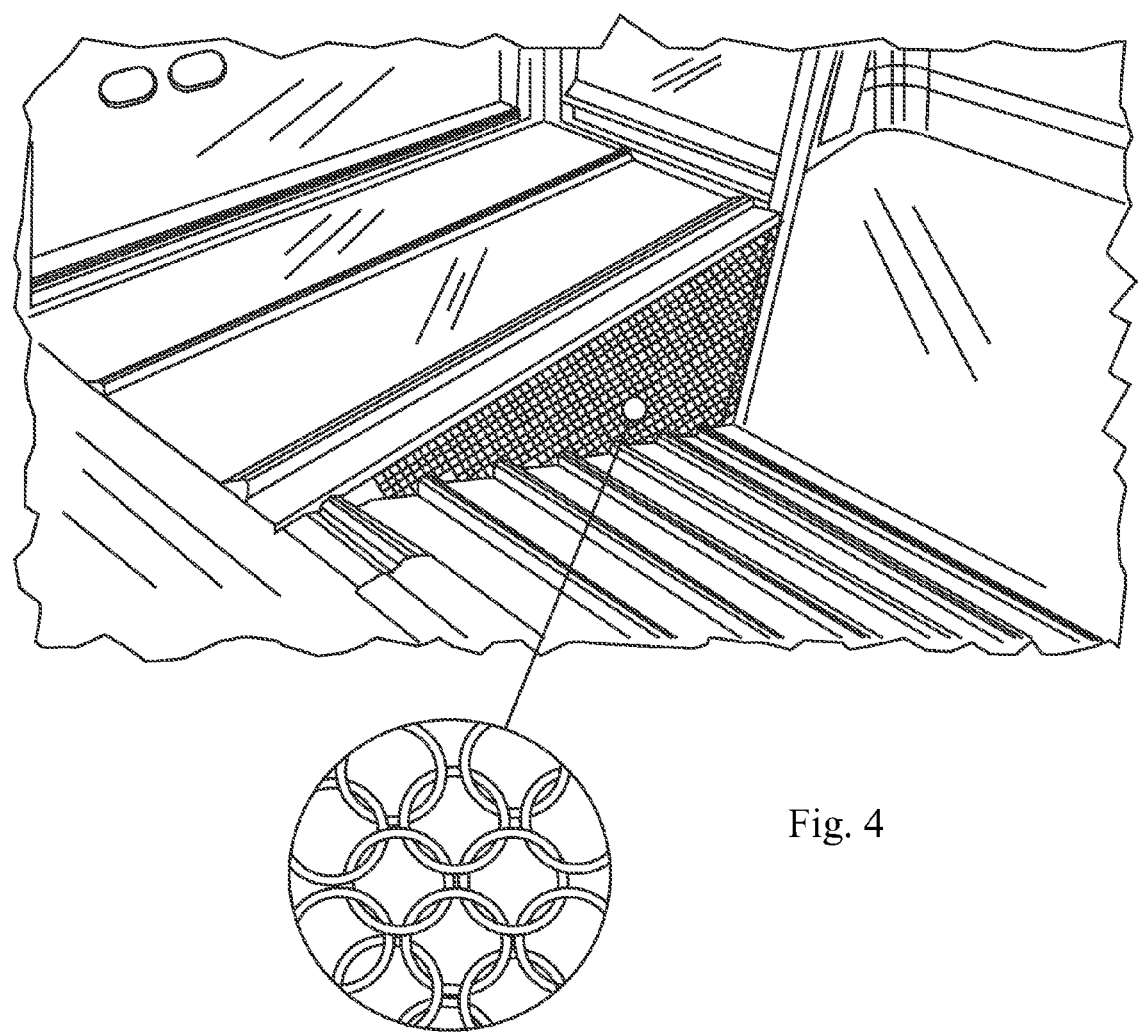
FIG. 4 is a view of the preferred flexible covering of stainless steel mesh or ring mail of the divider panel.
Figure 5:
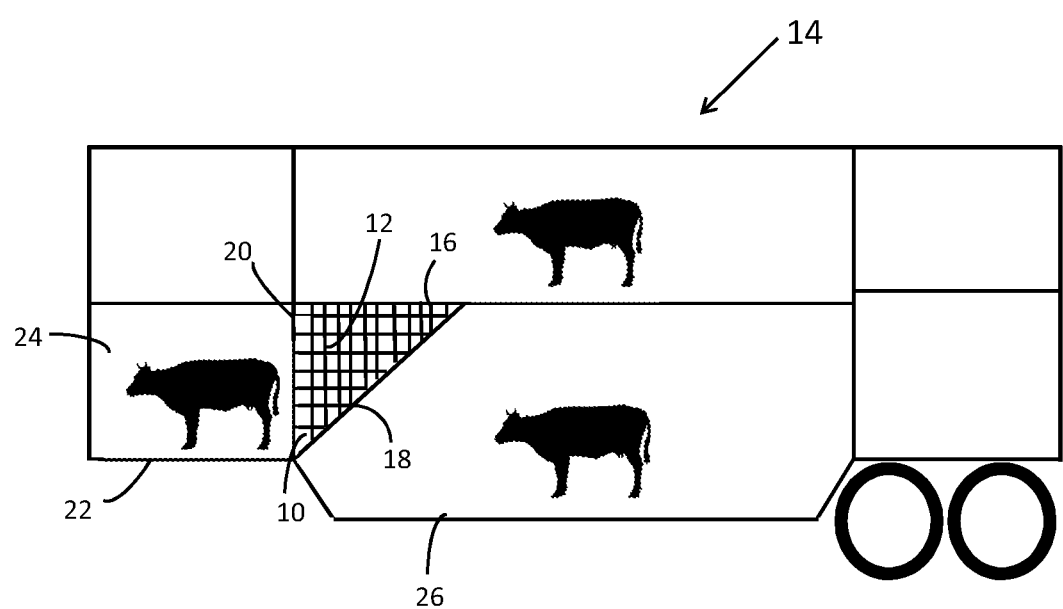
FIG. 5 is a side view of the internal structure of a livestock trailer showing the upper and lower decks, nose compartment, counterbalance, gap and divider panel.

A preferred embodiment of the disclosed technology is shown in FIGS. 1 through 3. FIG. 1 shows the disclosed divider panel 10 mounted in gap 12 of a livestock hauling trailer 14. The gap 12 is a triangular opening formed on one side by the upper deck 16, on another side by the counterbalance 18, and on a third side by a support post on the sidewall 20 of the nose compartment deck 22. Shown is the nose compartment 24, which is located over the fifth wheel mounting structure, and is at a height intermediate to the height of the upper deck 16, and the lower deck 26. When the trailer 14 is to be loaded, the counterbalance 18 is lowered from a horizontal position to an angled position, to provide access for livestock to enter the nose compartment 24 from the upper deck 16. The divider panel 10 is preferably made of chain mail or stainless steel mesh. Any gaps in the material of the divider panel 10 must be small enough that the livestock being transported can't push a hoof or foot through the opening. A preferred material for the divider panel is Industrial Mesh, available at Mailletec Industries. A preferred product is made of stell rings 0.21" in diameter and interlocked with neighboring rings. The material of the rinds is 0.0028" in diameter. A tough vinyl or nylon or neoprene mesh or screen would also be applicable.

FIG. 2 is another view of the divider panel 10 installed in the gap 12. The triangle of the divider panel includes a hypotenuse side 28, an opposite side 30, and an adjacent side 32, which are named using standard terms of geometry. The hypotenuse side 28 is attached to the side of the counterbalance 18. The opposite side 30 is unattached. The adjacent side is attached to the edge of the upper deck 16. Thus attached, the divider panel covers the gap 12.

FIG. 3 is a different view of the divider panel 10 installed in the gap 12. This view is from the lower deck 26, looking into the nose compartment 24. Shown is the underside of the counterbalance 18. The divider panel is attached using bolts or rivets. One storage strategy is to roll the divider panel and secure it with a strap or ties. Shown in FIG. 3 is a nose compartment gate 34, which separates the lower deck from the nose compartment 24 and is attached to the support post 20. Alternatively, the divider panel 10 can be mounted in a rigid frame, and can hinge to the bottom of the upper deck 16 for storage.

When the driver wants to load livestock into the trailer, he enters the trailer on the upper deck, and lowers the counterbalance. Then the required number of livestock enters the upper deck, and are herded toward the nose compartment. When they are in the nose compartment, the driver raises the counterbalance. It is during the loading of lifestock into the nose compartment that the divider panel is useful.

While certain exemplary embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A divider panel for use in a livestock hauling trailer, with the trailer having a lower and an upper deck, with a nose compartment with a nose compartment deck separated from the two decks, with said nose compartment deck loadable from the upper deck by use of a counterbalance which hinges from an end of said upper deck floor, said divider panel comprising, in which a gap is formed between said counterbalance and said upper deck when said counterbalance is lowered;
a triangular flexible panel attached to one or both sides of the counterbalance, with one edge of each panel attached to an edge of said upper deck, and with one edge of said panel attached to an edge of said counterbalance, so that when said counterbalance is lowered to access said lower deck of the nose area, said panel covers the triangular side openings on one or both sides of said counterbalance.

2. The divider panel of claim 1 in which said triangular flexible panel is comprised of a hypotenuse side attached to a side of said counterbalance, and an adjacent side attached to said upper deck.

3. A divider panel for use in a livestock hauling trailer, with the trailer having a lower and an upper deck, with a nose compartment with a nose compartment deck separated from the two decks, with said nose compartment loadable from said upper deck by use of a counterbalance which hinges from an end of said upper deck floor, in which a gap is formed between said counterbalance and said upper deck when said counterbalance is lowered said divider panel comprising;
a triangular flexible panel comprised of a hypotenuse side attached to a side of said counterbalance, and an adjacent side attached to said upper deck, so that when said counterbalance is lowered to access the lower deck of the nose area, said panel covers the triangular side openings on one or both sides of said counterbalance.

* * * * *